April 9, 1957 L. K. SCHMIDT 2,787,844
DITCH CLEANING IMPLEMENT
Original Filed April 30, 1951 3 Sheets-Sheet 1
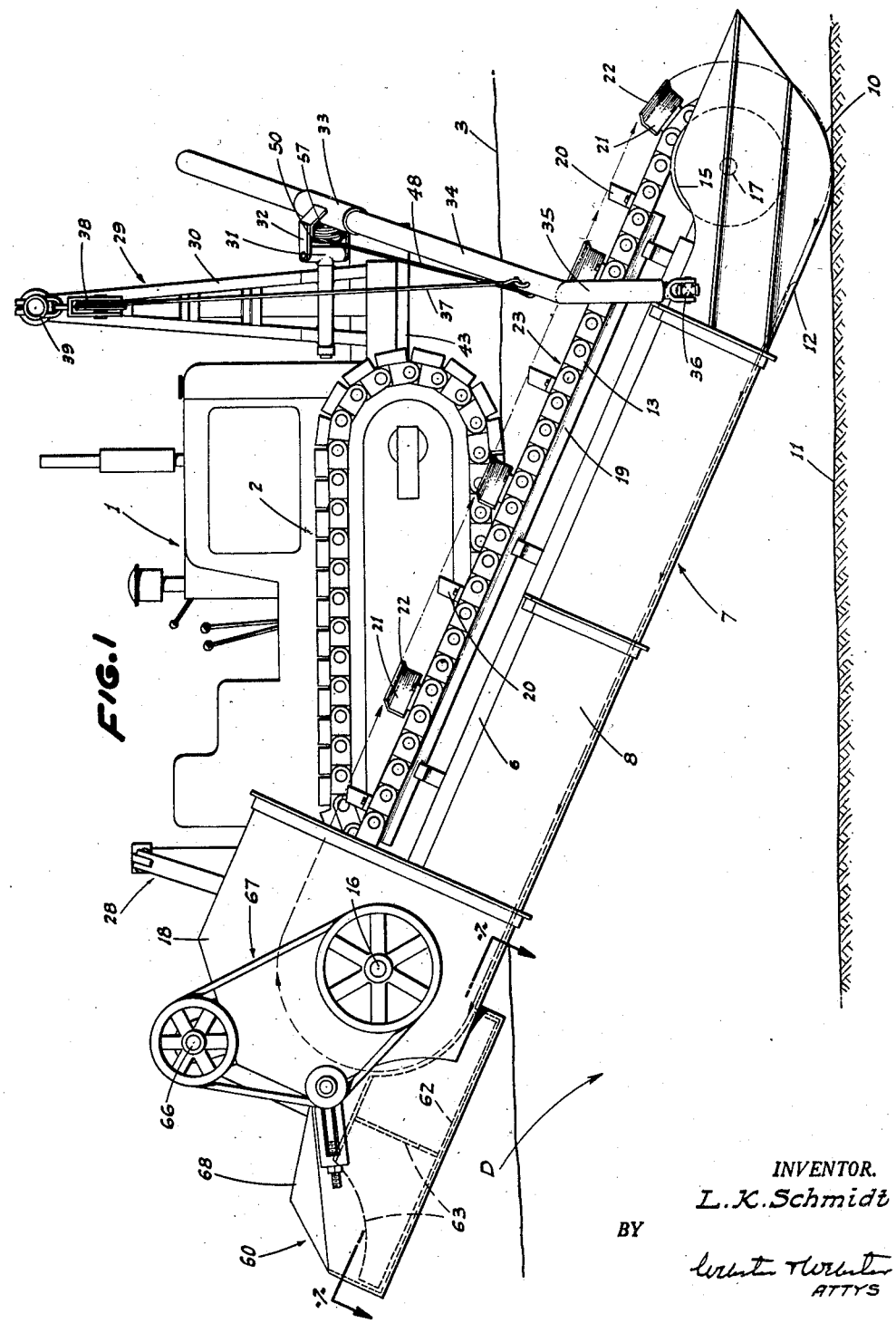
INVENTOR.
L.K.Schmidt
BY
ATTYS April 9, 1957 L. K. SCHMIDT 2,787,844
DITCH CLEANING IMPLEMENT
Original Filed April 30, 1951 3 Sheets-Sheet 2
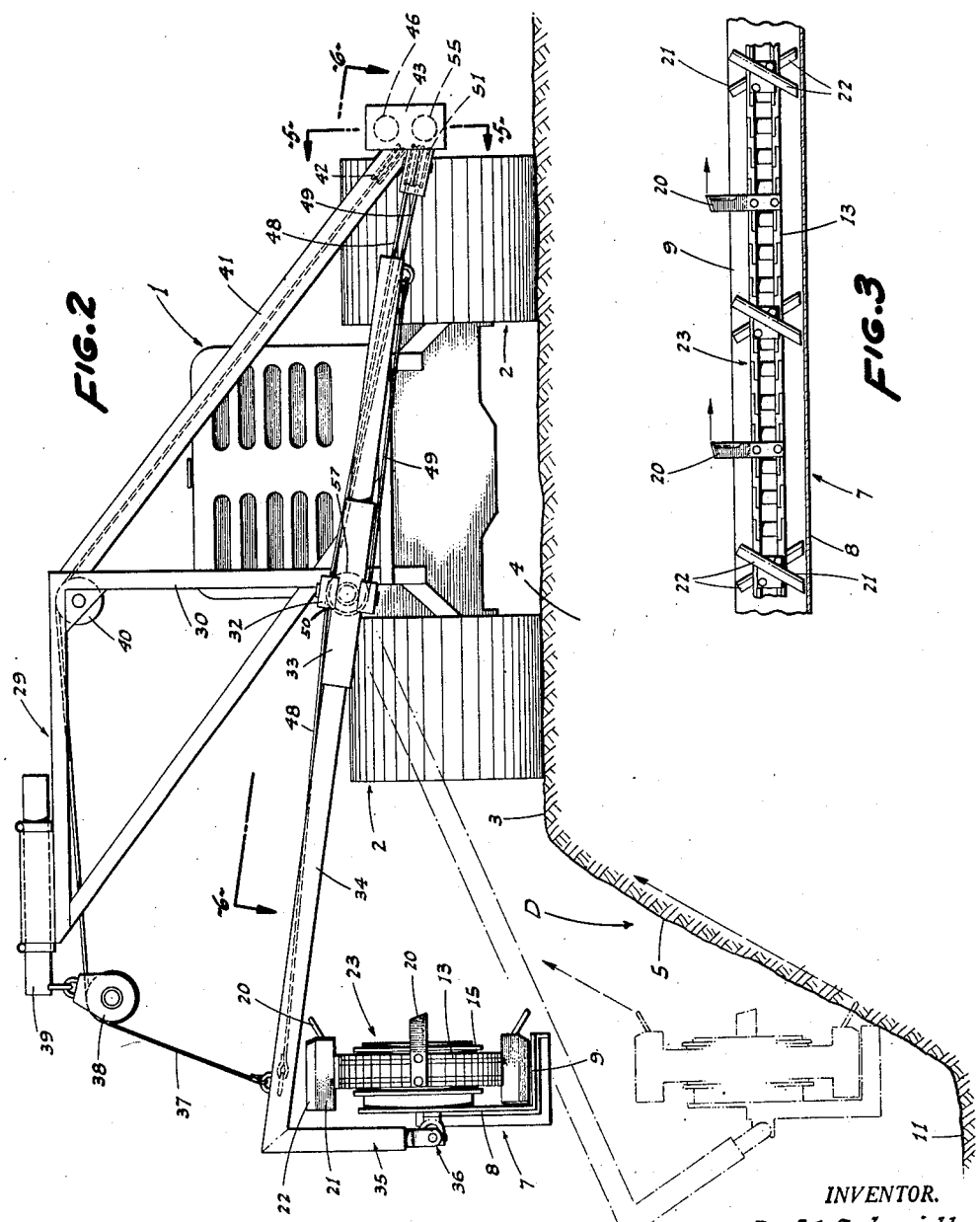
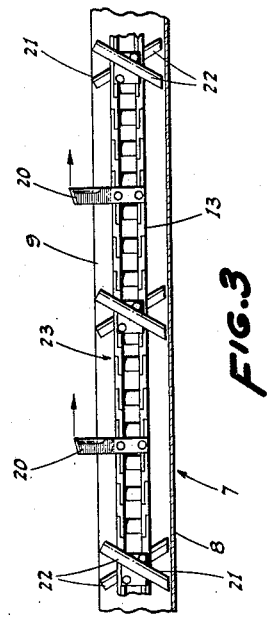
INVENTOR.
L. K. Schmidt
BY
ATTYS April 9, 1957  L. K. SCHMIDT  2,787,844
DITCH CLEANING IMPLEMENT
Original Filed April 30, 1951  3 Sheets-Sheet 3
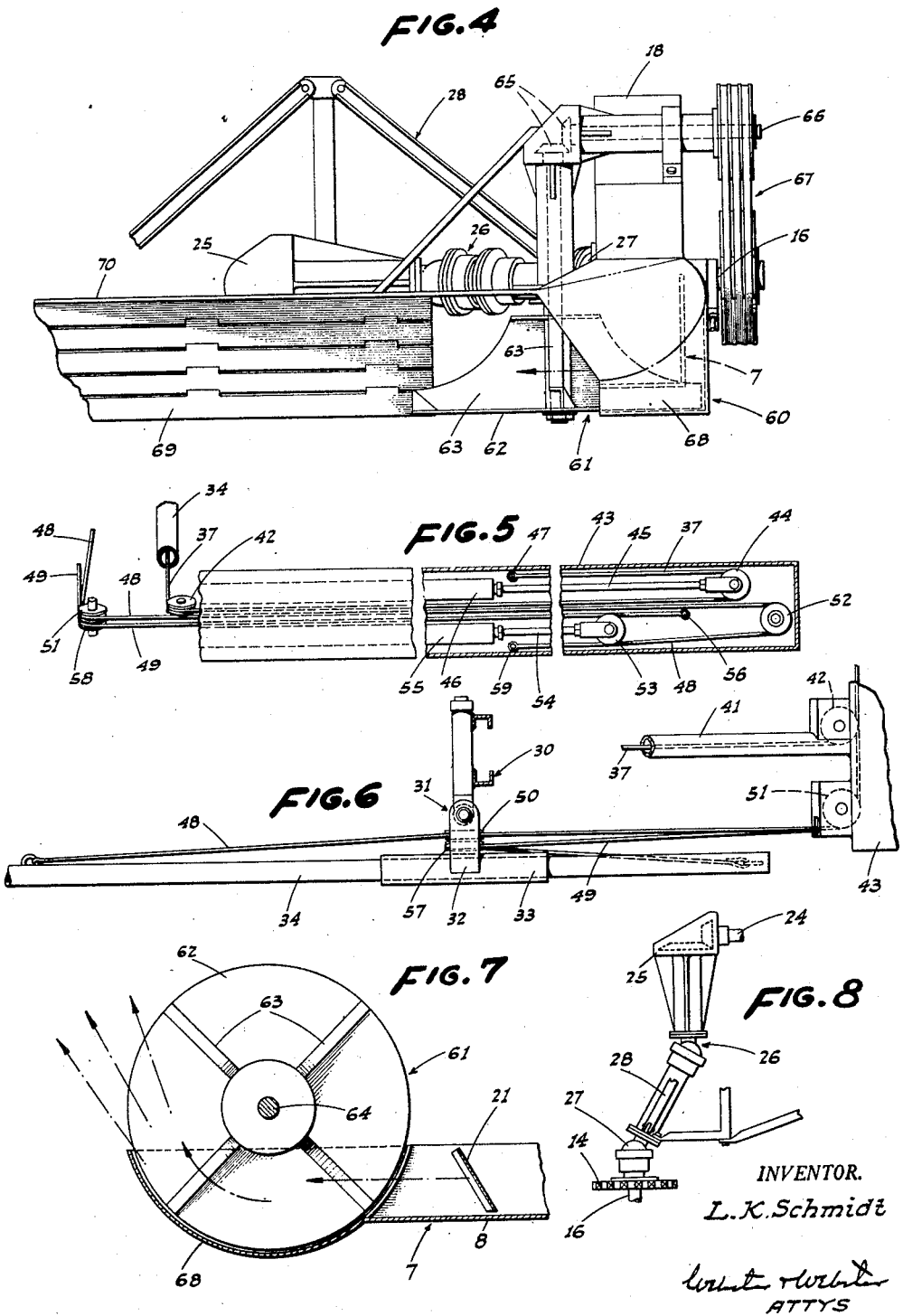

United States Patent Office 2,787,844
Patented Apr. 9, 1957

2,787,844

DITCH CLEANING IMPLEMENT

Lloyd K. Schmidt, Walnut Grove, Calif., assignor of one-half to Robert E. Simons, one-fourth to Kenneth R. Stewart, and one-fourth to Ralph P. Farnsworth, Rio Vista, Calif.

Continuation of application Serial No. 223,765, April 30, 1951, now Patent No. 2,681,517, dated June 22, 1954. This application May 10, 1954, Serial No. 428,420

7 Claims. (Cl. 37—86)

This invention relates to improvements in a ditch cleaning implement for removing weeds and debris from the sidewalls of the banks of a ditch. The implement includes, generally, a driven endless chain-cutter unit mounted on a tractor in position to extend, from adjacent the rear and to one side thereof, at a forward and downward incline into a ditch in cutting and material removing relation to the near sloping sidewall of the ditch bank along which the tractor travels.

One of the important objects of this invention is to provide the endless chain-cutter unit with a novel and effective arrangement of shear blades and material conveying or removing blades.

Another important object of the invention is to provide, in connection with the endless chain-cutter unit, a power driven impeller mounted in material receiving relation to the upper and discharge end of said unit; said impeller being operative to forcefully deliver such material—i. e. cut weeds, debris, etc.—laterally in scattered relation onto the top of the ditch bank rearwardly of the tractor.

An additional object of the invention is to provide the implement with a novel boom assembly by means of which the forward end of the endless chain-cutter unit, which is universally mounted at its rear and upper end, is suspended for selective lateral and vertical adjustment whereby the unit can be properly set to the depth of the ditch and the incline of the near sidewall thereof.

It is also an object to provide a ditch cleaning implement which is designed for ease and economy of manufacture; ready installation on a tractor; and long service, with a minimum of maintenance or repair being required.

Still another object of the invention is to provide a ditch cleaning implement which is practical and reliable, and yet exceedingly effective for the purpose for which it is designed.

These objects are accomplished by means of such structure and relative arrangement of parts as will fully appear by a perusal of the following specification and claims.

This application is a continuation, as to all common subject matter, of application Serial No. 223,765, filed April 30, 1951, now United States Letters Patent No. 2,681,517, dated June 22, 1954.

In the drawings:

Fig. 1 is a side elevation of the implement as tractor mounted and in use.

Fig. 2 is a front end elevation, the endless chain-cutter unit being shown in raised or transport position in full lines, and in lowered or working position in broken lines.

Fig. 3 is a fragmentary plan view of the endless chain, showing the arrangement of blades thereon.

Fig. 4 is a rear end elevation of the implement.

Fig. 5 is an enlarged fragmentary side elevation, partly in section, on line 5—5 of Fig. 2; the view showing the power cylinder actuated cable system for the boom assembly.

Fig. 6 is an enlarged fragmentary plan view, on line 6—6 of Fig. 2, showing the boom mounting, and a portion of said cable system.

Fig. 7 is a fragmentary sectional plan view on line 7—7 of Fig. 1, showing the material impeller.

Fig. 8 is a fragmentary diagrammatic plan view showing the drive connections between the power take-off shaft of the tractor and the upper or drive sprocket of the endless chain-cutter unit.

Referring now more particularly to the drawings, and to the characters of reference marked thereon, the improved ditch cleaning implement is adapted to be mounted on a tractor, indicated generally at 1, which tractor includes endless tracks 2; the tractor being adapted to travel on the top 3 of one bank 4 of a ditch D; the implement, as hereinafter described, being operative to cut or scrape weeds, brush, and other debris from the near slope sidewall 5 of the ditch bank 4; to convey the cut or scraped material upwardly or rearwardly to a point back of the tractor; and to then discharge the material in scattered relation on the top 3 of the ditch bank 4.

The implement, for the accomplishment of the above, comprises an elongated frame 6 which is adapted to extend from adjacent the rear of the tractor at a downward and forward incline—i. e. at a laterally outward and downward diagonal—into the ditch D when in working position.

The elongated frame 6 includes a full length trough 7 which includes an outer side plate 8 and a bottom 9; the trough being open on the side adjacent the sidewall 5 of the ditch bank 4.

At its forward end the outer side plate 8 of the trough is rounded at the bottom, as at 10, to form a skid which rides the bottom 11 of the ditch. The bottom 9 of the trough 7 terminates short of the skid 10 as a cutting edge 12 which aids to scoop material from adjacent the ditch bottom 11 into the trough 7.

A longitudinally extending chain 13, having upper and lower runs, is disposed within the assembly of the frame 6 and trough 7; such endless chain being carried, at its ends, on a rear sprocket 14 and a forward sprocket 15. The corresponding cross shafts which carry such sprockets are indicated at 16 and 17, respectively.

The endless chain 13 at its upper or rear end—i. e. the portion which turns about the sprocket 14—is enclosed within a housing 18 fixed in connection with the frame 6 and trough 7; the upper run of the endless chain 13 being supported from below by a longitudinal guide member 19 fixed to the frame 6.

At spaced points in the length thereof the endless chain 13 is fitted—on the outside—with a plurality of blades; such blades including shear blades 20 and material conveying blades 21 fixed alternately on said chain.

The shear blades 20 are secured transversely to the endless chain and project laterally inwardly a substantial distance; the inwardly projecting portions of said shear blades being canted so that they project at an upward and inward diagonal when in the upper run and project at a downward and inward diagonal when in the lower run. The projecting portions of the shear blades 20, which extend laterally inwardly of the adjacent edge of the trough bottom 9, are sharpened on their leading edges, as shown. See Fig. 3.

The material conveying blades 21, which are paddle-like and radiate from the chain, are each diagonally attached to said chain; the diagonal being such that the leading ends of said blades 21 are disposed laterally inwardly; i. e., adjacent the open side of the trough 7. At their radially outermost edges, the diagonal, material conveying blades 21 are formed with forwardly inturned lips 22, which lips—when in the lower run of the endless chain 13—work close to the bottom 9 of the trough 7 with a material scooping action; the blades 21 being in width substantially equal to the width of said bottom 9 and working, in the bottom run of the chain, in close cooperative relation not only to said bottom but also to the side plate 8.

The foregoing assembly of the frame 6, trough 7, housing 18, and sprocket supported chain 13 with blades 20 and 21 thereon, form what may be termed an endless chain-cutter unit, and which is indicated generally by the reference numeral 23. Such endless chain-cutter unit 23 is supported and driven at its rear end, from the tractor 1, in the following manner:

The power take-off shaft 24 at the rear of the tractor 1 drives a direction-changing gear box 25, and in turn power is transmitted from said gear box 25 to the cross shaft 16 by means of a housed, drive shaft unit 26 which includes a universal joint 27, one of whose parts is fixed in connection with the housing 18.

In addition to providing the drive for the cross shaft 16, the above arrangement also effectively supports—universally—the rear end of the endless chain-cutter unit 23, whereby it may extend adjustably into the ditch 1 for working engagement with the sidewall 5. The housed, drive shaft unit 26 is suitably brace-connected with the frame of the tractor by means which includes a rigid upstanding A-frame 28, one of the arms of which ties to the unit 26 adjacent the universal joint 27.

The forward end of the endless chain-cutter unit 23 is suspended for vertical and horizontal adjustment, selectively, by means of the following arrangement:

A vertical, laterally projecting suspension frame, indicated generally at 29, is fixed on the tractor at the front, and is dimensioned so that the upper and outer end of said frame overhangs the ditch D.

The suspension frame 29 includes a post unit 30, which post unit is fitted—adjacent its lower end and on the front—with a longitudinal axis, universal mount 31 having a forwardly projecting clevis 32 which connects to a generally laterally extending supporting and guide sleeve 33.

A tubular boom 34 slidably engages through the sleeve 33 and thence projects to an outer end termination in overhanging relation to the ditch D between the corresponding portion of the frame 29 and the forward end of the endless chain-cutter unit 23. At its outer end the boom 34 includes a downturned leg 35 universally connected, as at 36, to the outside of said unit 23 adjacent its forward end.

It will be evident that upon sliding of the boom 34 through the sleeve 33 the unit 23 can be adjusted laterally with respect to the sidewall 5, whereas swinging of said boom 34 up or down adjusts said unit 23 vertically; such movements being permitted by the universal joint 27 and to the end that the unit 23 can be selectively adjusted to work in substantially matching relation along the sidewall 5 upon forward travel of the tractor 1.

The selective adjustments—i. e. in or out, or up or down—of the boom 34 are accomplished as follows:

A hoist cable 37 is connected at one end to the outer portion of the boom 34, and thence extends upwardly and turns over a direction-changing sheave 38 suspended from an adjustable arm 39 on the outer or projecting end of the suspension frame 29. From the sheave 38 the hoist cable 37 passes over another direction-changing sheave 40, travels downwardly within a tubular brace 41, turns rearwardly about a sheave 42, and thence extends into an elongated or longitudinal housing 43 mounted on the side of the tractor opposite the ditch D.

Within the housing 43 the cable 37 leads to, and turns about, a sheave 44 on the outer end of a rearwardly advanced piston rod 45 of a fluid pressure actuated power cylinder 46 in said housing 43. After passing over the sheave 44 the cable 37 is anchored, as at 47.

With the foregoing arrangement the power cylinder 46 can be worked to cause raising or lowering of the boom 34.

The boom 34 is adjusted in or out, through the universally mounted guide sleeve 33, by another cable system which includes a pair of cables 48 and 49.

The cable 48 is anchored to the outer end of the boom 34 and thence extends lengthwise thereof over a sheave 50 in the clevis 32, and then runs to, and turns about, a sheave 51 at the front end of the housing 43. From the sheave 51 the cable 48 runs into said housing, turns about a rear end sheave 52, and thence returns to and leads about one of the double sheaves 53 on the end of a piston rod 54 extending rearwardly from a double acting fluid pressure actuated power cylinder 55 in said housing 43. From the engagetd one of the double sheaves 53 the cable 48 leads rearwardly again to an anchor point 56. The other cable 49 is anchored to the rear of the boom 34, thence extends forwardly and turns about a separate sheave 57 in the clevis 32, thence running to and turning about a sheave 58 at the forward end of the housing 43 adjacent the sheave 51.

From the sheave 58 the cable 49 extends into the housing 43, turns about the other of the double sheaves 53, and thence runs forward to an anchor point 59.

With the foregoing arrangement it will be recognized that the described cable system, including cables 48 and 49, will—upon reverse actuation of the power cylinder 55—cause the boom 34 to be forcefully adjusted either inwardly or outwardly with a sliding motion through the universally mounted guide sleeve 33.

For the purpose of clarity, the valve controlled conduit assembly for the power cylinders 46 and 55 is omitted, but is of a generally conventional type.

When the ditch cleaning implement is in use the endless chain-cutter unit 23, with proper adjustment of the boom 34, is lowered into the ditch D and set to work in substantially matching engagement with the sidewall 5 as the tractor advances. With such advance, and with the endless chain 13 driven at substantial speed, with the upper run traveling forwardly and downwardly, and the lower run traveling upwardly and rearwardly, in the trough 7, the shear blades 20 in said lower run effectively cut or scrape the weeds, brush, and other debris from the sidewall 5 of the ditch bank 4. Such cut or scraped material is caught in the openside trough 7, and conveyed upwardly and rearwardly therein by the paddle-like material conveying blades 21.

From the upper end of the trough the material is delivered therefrom into a power driven, centrifugal impeller unit, indicated generally at 60, and whose function is to distribute or scatter the material, cut from the sidewall of the ditch bank, onto the top 3 of said bank rearwardly of the tractor. The impeller unit 60 is constructed and functions in the following manner:

A centrifugal impeller 61, including a circular base or disc 62 with radial vanes 63 upstanding therefrom in circumferentially spaced relation, is mounted on the lower end of an upstanding spindle 64.

The spindle 64 is connected at its upper end by bevel pinions 65 with a countershaft 66 disposed above but parallel to the driven cross shaft 16. The spindle 64 and the countershaft 66 are suitably enclosed, as shown, and supported from the housing 18. The countershaft 66 is driven from the cross shaft 16, at relatively high speed, by an endless belt and pulley unit 67.

The housing 18 is open at the rear end to the extent necessary for the material to be delivered from the trough 7 onto the impeller 61; the latter being enclosed on the side adjacent the ditch by a shroud 68 mounted on the cutter unit, which shroud opens laterally in the direction of the top 3 of the ditch bank 4.

With the impeller 61 rotating at substantial speed, the material delivered thereto from the trough 7 is distributed by centrifugal action laterally inwardly, as indicated by the arrows in Fig. 7, onto the top of the ditch in scattered relation thereon and rearwardly of the tractor.

In order to prevent any of the centrifugally discharged material from being thrown onto the tractor, or the tracks thereof at the rear, a transversely extending, flexible shield 69 depends from a rigid top arm 70 fixed in connection with the assembly of housing 18 and shroud 68 in order that said shield 69 always remains in a position between the discharge zone of the impeller unit 60 and the rear of the tractor.

With the above described tractor mounted implement the sidewalls of the banks of irrigation ditches or the like can be effectively, positively, and smoothly cleaned, with the cut or scraped-away material distributed by scattering on top of the ditch bank and so that such material does not obstruct travel thereon by trucks, tractors, or the like.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as being new and useful, and upon which Letters Patent are desired:

1. In a tractor-mounted ditch cleaning implement which includes an endless cutter unit extending lengthwise at one side of the tractor and depending into working engagement with the near side wall of the ditch bank on which the tractor travels, said unit being adapted to scrape said side wall and to convey the scraped material to the rear end of said unit for delivery therefrom, and means on the tractor to support and drive said endless cutter unit; an impeller disposed adjacent the rear of the cutter unit in position to receive material delivered therefrom, means mounting the impeller in connection with the cutter unit, power means coupled to and driving the impeller, the impeller being operative to discharge such material laterally inwardly onto the top of said ditch bank rearwardly of the tractor; the impeller being disposed with its axis upstanding, and including a base plate having a plurality of circumferentially spaced vanes radiating thereon; and a shroud about that side of the impeller which is adjacent the ditch and extending over the corresponding top portion of the impeller from adjacent the level of the base plate, and means mounting the shroud in connection with the cutter unit; the cutter unit being arranged in laterally outwardly offset relation to the center of the impeller to deliver to the impeller within the shroud.

2. In a tractor-mounted ditch cleaning implement which includes an endless cutter unit adapted to extend lengthwise, at one side of the tractor, at a forward and downward incline in scraping engagement with the near sidewall of the ditch bank on which the tractor travels, means to support and drive the endless cutter unit adjacent its rear end from the tractor, said means including a universal connection which permits of vertical and horizontal swinging adjustment of said endless cutter unit ahead of said connection, and means suspending the forward end of said endless cutter unit from the tractor for selective vertical and horizontal adjustment; said unit being adapted to scrape said sidewall and to convey the scraped material to the rear end of said unit for delivery therefrom; said last named means including a laterally projecting boom mounted for longitudinal sliding and vertical swinging adjustment selectively, and a cable system arranged in connection with the boom operative to effect said selective adjustment thereof.

3. In a tractor-mounted ditch cleaning implement which includes an endless cutter unit adapted to extend lengthwise, at one side of the tractor, at a forward and downward incline in scraping engagement with the near sidewall of the ditch bank on which the tractor travels, means on the tractor to support and drive the endless cutter unit adjacent its rear end from the tractor, said means including a universal connection which permits of vertical and horizontal swinging adjustment of said endless cutter unit ahead of said connection, a front suspension frame projecting laterally from the tractor at said one side, a boom projecting laterally from the tractor on the same side and between the suspension frame and forward end of said endless cutter unit, the boom being universally connected at its outer end to said unit, means mounting the boom in connection with the tractor for vertical swinging in a transverse plane and for sliding to and fro laterally of the tractor, a power cylinder actuated cable system vertically adjustably suspending the boom from the suspension frame, and another power cylinder actuated cable system connected to the boom to slide the same to and fro.

4. In a tractor-mounted ditch cleaning implement which includes an endless cutter unit extending lengthwise at one side of the tractor and depending into working engagement with the near side wall of the ditch bank on which the tractor travels, said unit being adapted to scrape said side wall and to convey the scraped material to the rear end of said unit for delivery therefrom, and means on the tractor to support and drive said endless cutter unit; an impeller disposed adjacent the rear of the cutter unit in position to receive material delivered therefrom, means mounting the impeller in connection with the cutter unit, power means coupled to and driving the impeller, the impeller being operative to discharge such material laterally inwardly onto the top of said ditch bank rearwardly of the tractor; a supporting arm rigid with and projecting laterally inwardly from adjacent the rear of said cutter unit, said arm being free of the tractor and spaced above the top of the ditch bank intermediate said tractor and the zone of discharge of material from the impeller, and a shield depending from the arm.

5. In a tractor-mounted ditch cleaning implement which includes an endless cutter unit adapted to extend lengthwise, at one side of the tractor, at a forward and downward incline in scraping engagement with the near sidewall of the ditch bank on which the tractor travels, means on the tractor to support and drive the endless cutter unit adjacent its rear end from the tractor, said means including a universal connection which permits of vertical and horizontal swinging adjustment of said endless cutter unit ahead of said connection, a front suspension frame projecting laterally from the tractor at said one side, a boom projecting laterally from the tractor on the same side and between the suspension frame and forward end of said endless cutter unit, the boom being universally connected at its outer end to said unit, means mounting the boom in connection with the tractor for vertical swinging in a transverse plane and for sliding to and fro laterally of the tractor, means applied to the boom to thus slide the same back and forth, a lift cable connected to the boom adjacent its outer end, a direction changing pulley from which the cable depends to the boom, a member from which the pulley is supported, and means mounting said member on the frame for adjusting movement in a direction lengthwise of the boom.

6. A tractor-mounted ditch cleaning implement comprising an endless cutter unit, and means to mount the unit on a tractor so that said unit depends into a ditch lengthwise and adjacent one side thereof; the unit comprising a longitudinal frame, a trough on the frame open to said one side of the ditch and including an upstanding sidewall and a bottom having a free longitudinal edge facing said ditch side, an endless chain journaled on and extending lengthwise of the frame and trough, and disposed with an upper and a lower run, the latter being within the trough, a plurality of shear blades secured on and projecting laterally from the chain beyond the inner edge of the trough bottom for engagement with said side of the ditch, and material conveying blades secured on the chain between the shear blades in depending relation to the chain when in the lower run thereof to engage the bottom of the trough.

7. An implement as in claim 6, in which the material conveying blades are diagonaled on the chain in a direction such as to be disposed at an acute angle to the sidewall of the trough when said blades are on the lower run of the chain.

References Cited in the file of this patent

UNITED STATES PATENTS

| Number | Name | Date |
|---|---|---|
| 1,074,480 | Ward | Sept. 30, 1913 |
| 1,397,679 | Dunlap | Nov. 22, 1921 |
| 1,414,832 | Rossi et al. | May 2, 1922 |
| 1,703,320 | Penote | Feb. 26, 1929 |
| 1,733,427 | Ruth | Oct. 29, 1929 |
| 1,745,090 | Geithle | Jan. 28, 1930 |
| 1,767,017 | Scheckler | June 24, 1930 |
| 1,869,446 | Weikel | Aug. 2, 1932 |
| 2,555,934 | Richey et al. | June 5, 1951 |
| 2,651,123 | Murphy | Sept. 8, 1953 |
| 2,681,517 | Schmidt | June 22, 1954 |
| 2,697,609 | Chase et al. | Dec. 21, 1954 |

FOREIGN PATENTS

| 570,756 | Great Britain | July 20, 1945 |